US010869092B2

(12) United States Patent
Greene

(10) Patent No.: US 10,869,092 B2
(45) Date of Patent: Dec. 15, 2020

(54) SYSTEMS AND METHODS FOR AN ADAPTIVE ELECTRONIC PROGRAM GUIDE

(71) Applicant: DISH Technologies L.L.C., Englewood, CO (US)

(72) Inventor: Gregory H. Greene, Littleton, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 15/457,071

(22) Filed: Mar. 13, 2017

(65) Prior Publication Data

US 2018/0262806 A1    Sep. 13, 2018

(51) Int. Cl.
| H04N 21/466 | (2011.01) |
| H04N 21/482 | (2011.01) |
| H04N 21/45 | (2011.01) |
| H04N 21/422 | (2011.01) |
| H04N 21/84 | (2011.01) |
| H04N 21/431 | (2011.01) |

(52) U.S. Cl.
CPC ... *H04N 21/4667* (2013.01); *H04N 21/42216* (2013.01); *H04N 21/431* (2013.01); *H04N 21/45* (2013.01); *H04N 21/4532* (2013.01); *H04N 21/482* (2013.01); *H04N 21/4821* (2013.01); *H04N 21/84* (2013.01)

(58) Field of Classification Search
CPC ........... H04N 21/4667; H04N 21/4821; H04N 21/4532; H04N 21/42216; H04N 21/84
See application file for complete search history.

(56) References Cited

U.S. PATENT DOCUMENTS

| 6,108,637 A * | 8/2000 | Blumenau ............... G06F 11/34 |
| | | 705/30 |
| 8,427,356 B1 | 4/2013 | Satish |

(Continued)

FOREIGN PATENT DOCUMENTS

WO        2002/037297 A1    5/2002

OTHER PUBLICATIONS

Invitation to Pay Additional Fees with Communication Relating to the Results of the Partial International Search and Provisional Opinion for International Application PCT/US2018/022022 dated Mar. 12, 2018, 13 pages.

(Continued)

*Primary Examiner* — Yassin Alata
(74) *Attorney, Agent, or Firm* — Seed IP Law Group LLP

(57) ABSTRACT

A set-top box or other receiving device may detect such channels that the EPG cursor visits frequently, visits for relatively long periods of time or that are frequently displayed on the screen in the electronic program guide (EPG), or otherwise frequently visited or viewed. The system determines that such channels are those that the user is likely to return to when browsing the EPG in the future and then adapts the EPG to present such channels on top of the EPG together with each other separately from the other full list of channels presented in the. This may be performed each time the EPG is opened. A customized EPG having the particular group of channels presented according a specific identified user's previous channel browsing activity may also be generated.

20 Claims, 7 Drawing Sheets

(56) References Cited

U.S. PATENT DOCUMENTS

| | | | | |
|---|---|---|---|---|
| 2003/0237093 | A1* | 12/2003 | Marsh | G06F 3/0481 |
| | | | | 725/46 |
| 2008/0276277 | A1* | 11/2008 | Ahn | H04N 5/44543 |
| | | | | 725/40 |
| 2010/0325668 | A1* | 12/2010 | Young | G04G 15/006 |
| | | | | 725/52 |
| 2012/0290952 | A1* | 11/2012 | Paluch | H04L 12/1818 |
| | | | | 715/758 |
| 2014/0104495 | A1* | 4/2014 | Preston | H04N 21/4826 |
| | | | | 348/570 |
| 2016/0316269 | A1 | 10/2016 | Parker | |

OTHER PUBLICATIONS

International Search Report and Written Opinion for International Application PCT/US2018/022022 dated Jul. 2, 2018, 19 pages.
International Preliminary Report on Patentability for PCT/US2018/022022, dated Sep. 26, 2019. 13 pages.

* cited by examiner

SYSTEMS AND METHODS FOR AN ADAPTIVE ELECTRONIC PROGRAM GUIDE

TECHNICAL FIELD

The technical field relates to electronic program guides and, more particularly, to an adaptive electronic program guide.

BRIEF SUMMARY

An electronic program guide (also referred to as an EPG) may have hundreds or thousands of channel listings and thus, it may take an inconvenient amount time for the user to scroll or page to the channel or various groups of channels that are of interest. Therefore, the set-top box or other receiving device may detect such channels that the EPG cursor visits frequently, visits for relatively long periods of time or that are frequently displayed on the screen in the EPG, or are otherwise frequently visited or viewed. The system may determine that such channels are those that the user is likely to return to when browsing the EPG in the future and then adapt the EPG to present such channels on top of the EPG together with each other separately from the other full list of channels presented in the electronic program guide. This may be performed each time the EPG is opened. In doing so, this enables the user to start navigation within the EPG within a table of channels that the user is more likely to return to, thus improving the EPG system by saving the user time in not having to scroll or page to the channels of interest each time the EPG is opened.

In some embodiments, previous channel browsing activity within the EPG may also be associated with a particular user or users, and such activity or associations stored in a user profile or user account. Using such stored information, upon user identification, a customized EPG having a particular group of channels that the identified user is likely to return to located separately on top of the EPG may be generated and presented to that identified user when that user opens the EPG.

Such information regarding channel browsing within the EPG may also be used to generate an adapted EPG on other devices for display on remote devices or display screens that are automatically customized for the user across multiple devices according to the user's channel browsing activity on one or more devices and EPGs at various locations.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
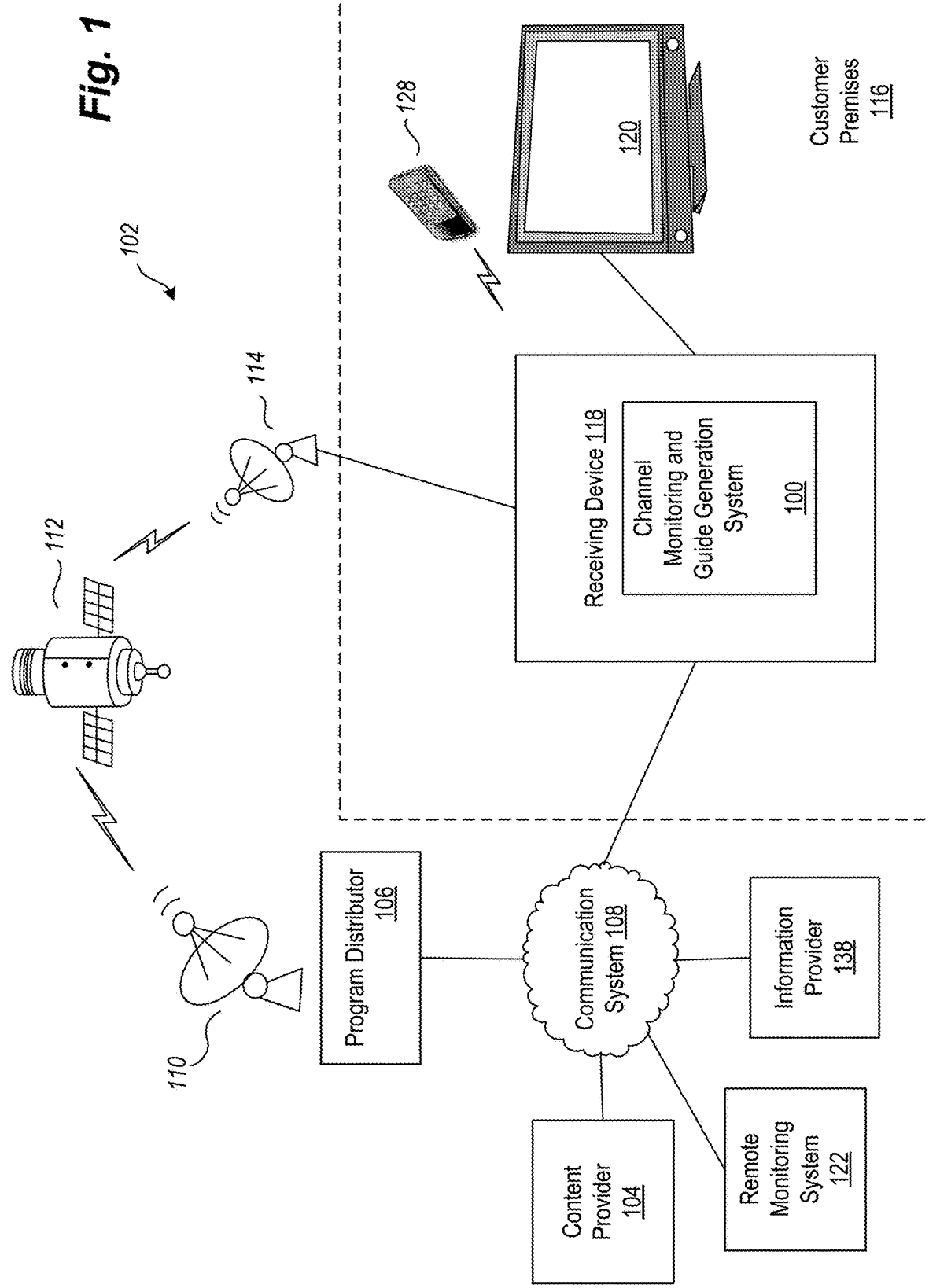
FIG. 1 is a block diagram illustrating an example content distribution environment in which embodiments of systems and methods for an adaptive electronic program guide may be implemented.

FIG. 1 is an overview block diagram illustrating an example content distribution environment 102 in which embodiments of systems and methods for an adaptive electronic program guide may be implemented. A channel monitoring and guide generation system 100 may be part of or otherwise operably coupled to an electronic device such as a receiving device 118 (e.g., on a customer premises 116) to monitor channel browsing on the receiving device 118 or on components in communication with the receiving device 118 and also generate an electronic program guide for display on presentation device 120. For example, the channel monitoring and guide generation system 100 may over time monitor channel browsing within an EPG being displayed on presentation device 120 and then generate an adapted EPG that includes channels that are frequently visited or displayed in the EPG in a separate section on top of the EPG so that the user can then easily return to these channels each time the EPG is opened without having to scroll or page down to these channels.

The channel monitoring and guide generation system 100 may also be operably connected to a communications system 108 to send and receive information regarding the monitoring of the channel browsing within the EPG on the receiving device 118 and/or other electronic devices in communication with the receiving device 118, and to send and receive configuration information regarding the receiving device 118 and/or other electronic devices in communication with the receiving device 118. The sending and receiving of such information via the communications system 108 may be to collect and/or send information regarding channel browsing within EPGs associated with the user or other users on other devices, such that this information may be used to generate the adapted EPG on the receiving device for display on presentation device 120. Such information may also be used to generate an adapted EPG on other devices for display on remote devices or display screens that are automatically customized for the user across multiple devices according to the user's channel browsing activity on one or more devices and EPGs at various locations.

In some embodiments, the channel monitoring and guide generation system 100 reports channel browsing data of the receiving device 118, or other electronic devices in communication with the receiving device 118, over the communication system 108 to a remote monitoring system 122. The receiving device 118 or remote monitoring system 122 may also perform analysis of the channel browsing data and generate an adapted EPG based thereon. In some embodiments, the remote monitoring system 122 may monitor the channel browsing activity occurring on the receiving device 118 via direct communication with the remote control device 128, such as via wireless communication over communication system 108, with the remote control device 128 reporting to the remote monitoring system 122 such channel browsing activity data or remote control commands entered by the user.

The channel monitoring and guide generation system 100 may also request additional analysis from the monitoring system 122 over the communication system 108. In some embodiments, the monitoring system 122, content provider 104, program distributor 106, and/or information provider 138 may generate the adapted EPG based on the channel browsing activity data received, and communicate data comprising the adapted EPG over the communications network 108 to the receiving device 118 or other devices associated with the user or customer premises 116. In some embodiments, this allows the channel monitoring and guide generation system 100 to be remotely located from the receiving device 118. The remote monitoring system 122 may be that of the content provider 104, program distributor 106, information provider 138, receiving device 118, manufacturer, (not shown) or other entity or third party.

The remote monitoring system 122 may also be a centralized monitoring system for multiple electronic devices, such as, for example, multiple receiving devices, at various remote locations, each receiving device 118 having a corresponding channel monitoring and guide generation system in operable communication with the communication system 108. The remote monitoring system 122 may also provide further analysis of channel browsing activity sent from the channel monitoring and guide generation system 100 of the receiving device 118 or from other channel monitoring and guide generation systems of other remote receiving devices. Before providing additional details regarding the operation and constitution of the channel monitoring and guide generation system 100, the example content distribution environment 102, within which the channel monitoring and guide generation system 100 may operate, will briefly be described.

In the content distribution environment 102, audio, video, and/or data service providers, such as, but not limited to, television service providers, provide their customers a multitude of video and/or data programming (hereafter, collectively and/or exclusively "programming"). Such programming is often provided by use of a receiving device 118 communicatively coupled to a presentation device 120 configured to receive the programming.

The receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by a user, the receiving device 118 processes and communicates the selected programming to the presentation device 120.

For example, the receiving device 118 may be a "television converter," "receiver," "set-top box," "television receiving device," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to receive or play back programming and communicate an EPG for presentation on presentation device 120. Further, the receiving device 118 may itself include user interface devices, such as buttons or switches. In many applications, a remote-control device ("remote") 128 is operable to control the receiving device 118 and/or the presentation device 120. The remote 128 typically communicates with the receiving device 118 using a suitable wireless medium, such as infrared ("IR"), radio frequency ("RF"), or the like. The channel monitoring and guide generation system 100 may also have such wireless functionality to communicate with and/or control other electronic devices remotely.

Examples of a presentation device 120 include, but are not limited to, a television ("TV"), a monitor, a projector, a media player, a smartphone, a tablet device, a mobile device, a personal computer ("PC"), a digital video recorder ("DVR"), game system, or the like. Presentation devices 120 employ a display, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality. Also, a channel monitoring and guide generation system such as channel monitoring and guide generation system 100 may also or instead be a part of, integrated with or otherwise operably coupled to various other electronic devices, such as presentation device 120 and/or remote 128 and, in various embodiments, may each operate independently or in conjunction with channel monitoring and guide generation system 100 of the receiving device 118.

A content provider 104 provides program content, such as television content, to a distributor, such as the program distributor 106. Example content providers include television stations which provide local or national television programming, and special content providers which provide premium based programming or pay-per-view programming.

Program content, which may also be referred to as a program, is communicated to the program distributor 106 from the content provider 104 through suitable communication media, generally illustrated as communication system 108 for convenience. Communication system 108 may include many different types of communication media, now known or later developed. Non-limiting media examples include telephone systems, the Internet, internets, intranets, cable systems, fiber optic systems, microwave systems, asynchronous transfer mode ("ATM") systems, frame relay systems, digital subscriber line ("DSL") systems, radio frequency ("RF") systems, cellular systems, and satellite systems.

In at least one embodiment, the received program content is converted by the program distributor 106 into a suitable signal (a "program signal") that is communicated (i.e., "uplinked") by one or more antennae 110 to one or more satellites 112 (separately illustrated herein from, although considered part of, the communication system 108). The communicated uplink signal may contain a plurality of multiplexed programs. The uplink signal is received by the satellite 112 and then communicated (i.e., "downlinked") from the satellite 112 in one or more directions, for example, onto a predefined portion of the planet.

A receiver antenna 114 that is within reception range of the downlink signal communicated from satellite 112 receives the above-described downlink signal. The receiver antenna 114 can be located at customer premises 116. Examples of customer premises 116 include a residence, a business, or any other suitable location operable to receive signals from satellite 112. The received signal is communicated, typically over a hard-wire connection, to the receiving device 118. The receiving device 118 converts the received signal from antenna 114 into a signal and/or format suitable for communication to a presentation device 120 or another device, such as another receiving device, a mobile device or a home computing system. In some embodiments, the receiver antenna 114 may be remotely located from the customer premises 116. For example, the antenna 114 may be located on the roof of an apartment building, such that the received signals may be transmitted, after possible recoding, via cable or other mechanisms, such as Wi-Fi, to the customer premises 116.

The receiving device 118 may receive programming partially, or entirely, from a source other than the above-described receiver antenna 114. Other embodiments of the receiving device 118 may receive programming from program distributors 106 and/or content providers 104 via locally broadcast RF signals, cable, fiber optic, Internet media, or the like.

In addition, information provider 138 may provide various forms of content and/or services to various devices residing in the customer premises 116. For example, information provider 138 may provide an EPG, a Web page or other information to the receiving device 118 or other computing device. Information provider 138 may further perform or facilitate electronic commerce transactions. Information provider 138 may also provide information regarding channel browsing activity with EPGs on electronic devices on the customer premises 116 and/or other locations in addition to, or instead of, such information being provided by the remote monitoring system 122.

In the illustrated example, the channel monitoring and guide generation system 100 may monitor the receiving device 118 as it performs operations related to channel browsing within an EPG being generated by the receiving device 118. The channel monitoring and guide generation system 100 may also control the receiving device 118 by causing the receiving device 118 to switch between, tune to and/or display particular received program content. The channel monitoring and guide generation system 100 may also control the receiving device 118 by causing the receiving device 118 to perform particular e-commerce transactions or perform other interactive operations, such as, for example, any commands that could be entered by a user via a remote control device or other interface. The channel monitoring and guide generation system 100 is configured to communicate channel browsing activity performed by the receiving device 118 and/or other electronic devices, such as remote 128 and presentation device 120, over the communication system 108 to remote entities, such as, for example, remote monitoring system 122, information provider 138, content provider 104 and/or program distributor 106 for further action, processing or reporting. For example, this further action, processing or reporting may include adapting and/or generating an EPG based on the received channel browsing activity.

The above description of the content distribution environment 102, the customer premises 116, and the various devices therein, is intended as a broad, non-limiting overview of an example environment in which various embodiments of systems and methods for an adaptive electronic program guide may be implemented. FIG. 1 illustrates just one example of a content distribution environment 102 and the various embodiments discussed herein are not limited to such environments. In particular, content distribution environment 102 and the various devices therein, may contain other devices, systems and/or media not specifically described herein. For example, in some embodiments, the channel monitoring and guide generation system 100 may be embedded or otherwise located in a component of a mobile device, smartphone or vehicle and the presentation device 120 may be that of a mobile device, vehicle navigation system or other audio-visual system.

Example embodiments described herein provide applications, tools, data structures and other support to implement systems and methods for an adaptive electronic program guide. The example of the electronic device having a channel monitoring and guide generation system 100 shown in FIG. 1 is receiving device 118. However, other embodiments of the described techniques may include other devices having a channel monitoring and guide generation system such that adaptive EPGs associated with other devices may be generated, including other receiving devices, such as audio and DVD players, digital recorders, computers, peripherals, output devices, televisions, mobile devices, smartphones, tablets and other electronic devices. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
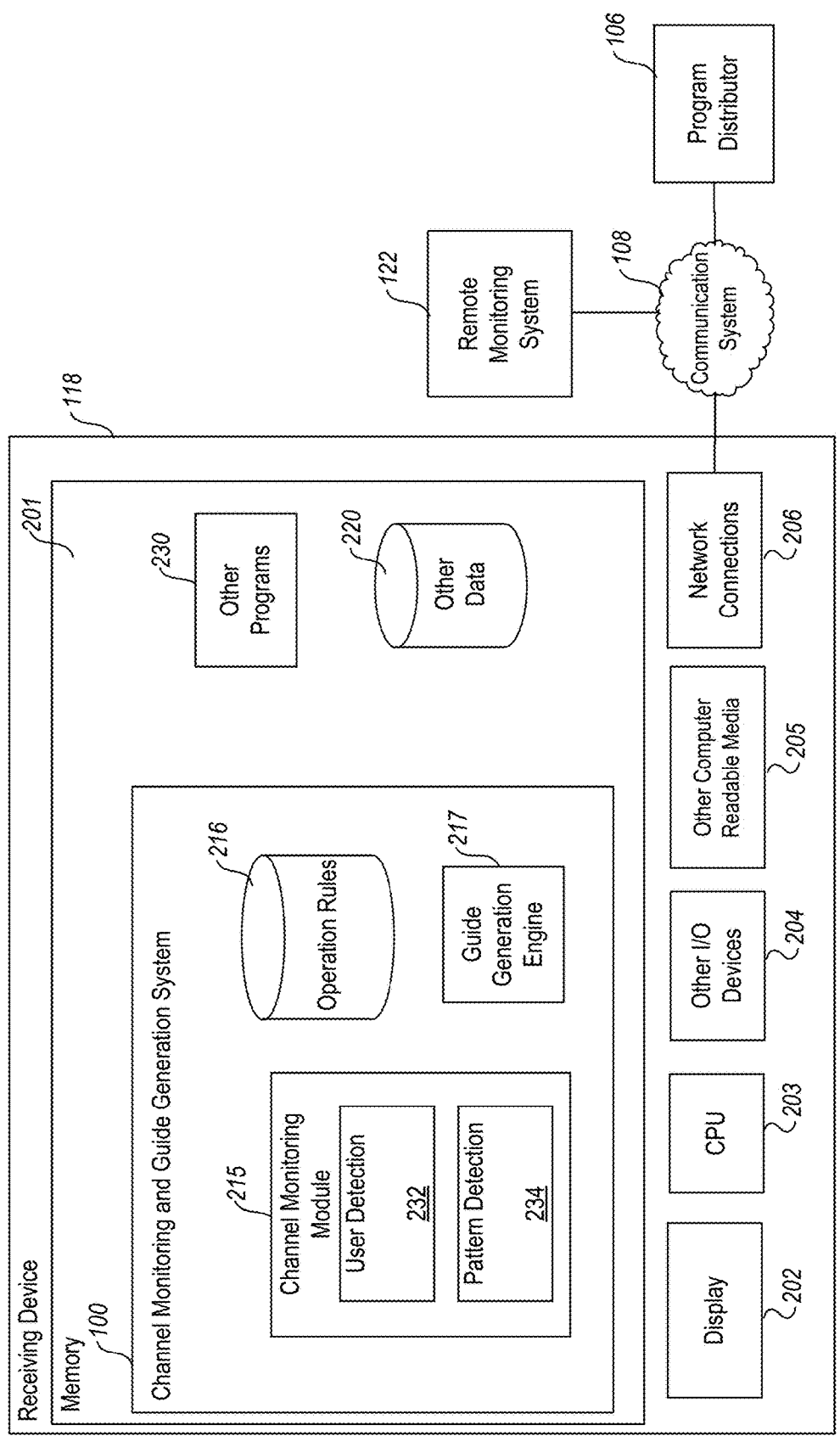
FIG. 2 is a block diagram illustrating elements of an example receiving device having a system for an adaptive electronic program guide according to one non-limiting embodiment.

FIG. 2 is a block diagram illustrating elements of an example receiving device 118 having a system for an adaptive electronic program guide according to one non-limiting embodiment.

In one embodiment, the receiving device 118 is a set-top box configured to receive, record and display programming on a presentation device, such as presentation device 120 shown in FIG. 1. In other embodiments, the receiving device 118 is part of a presentation device, such as a television, or is a digital video recorder (DVR) device or part of a mobile device or other portable computing device. Note that one or more general purpose or special purpose computing systems/devices may be used to operate and store information regarding the receiving device 118, and communicate with communication system 108. In addition, the receiving device 118 may comprise one or more distinct computing systems/devices and may span distributed locations. Furthermore, each block shown may represent one or more such blocks as appropriate to a specific embodiment or may be combined with other blocks. Also, the channel monitoring and guide generation system 100 of the receiving device 118 may be implemented in software, hardware, firmware, or in some combination to achieve the capabilities described herein.

In the embodiment shown, receiving device 118 comprises a computer memory ("memory") 201, a display 202, one or more Central Processing Units ("CPU") 203, Input/Output devices 204 (e.g., keyboard, mouse, RF or infrared receiver, light emitting diode (LED) panel or liquid crystal display (LCD), USB ports, other communication ports, and the like), other computer-readable media 205, and network connections 206. The operation rules stored in the operation rules store 216 and electronic program guide generation engine 217 portions of the channel monitoring and guide generation system 100 are shown residing in memory 201. In other embodiments, some portion of the contents, and some, or all, of the components of operation rules stored in the operation rules store 216 and electronic program guide generation engine 217 may be stored on and/or transmitted over the other computer-readable media 205. The operation rules stored in the operation rules store 216 and electronic program guide generation engine 217 components of the channel monitoring and guide generation system 100 preferably execute on one or more CPUs 203 and facilitate the monitoring of channel browsing activity and generation of an adaptive EPG as described herein. The channel monitoring and guide generation system 100 also facilitates communication with peripheral devices, such as remote 128 and remote systems, such as remote monitoring system 122 and program distributor 106, via the I/O devices 204 and network connections 206. For example, the channel monitoring and guide generation system 100 may also interact via the communication system 108 with other devices and systems such as the program distributor 106, remote monitoring system 122, or the like. For example, the other device may be a home computing system (e.g., a desktop computer, a laptop computer, etc.) or mobile device that includes the functionality of the operation rules stored in the operation rules store 216 and electronic program guide generation engine 217 components of the channel monitoring and guide generation system 100.

A channel monitoring module 215 monitors patterns of channel browsing within an electronic program guide of channels presented in the electronic program guide. The electronic program guide may be presented on the presentation device 120 and comprise one or more tables of television channels available from the content provider 104 and/or program distributor 106. In some embodiments, each row of the one or more tables represents a different television channel and includes programming of the different television channel, and columns of the one or more tables each represent different time slots for programming of the television channels. For example, the channel monitoring module 215 may detect when a user moves a cursor within an EPG to particular channel. The cursor may be a graphical indication on the EPG highlighting, bolding, outlining or otherwise delineating a particular row or channel within the EPG. When the user presses the select button on the remote control device 128 while the cursor is on a particular channel in the EPG, that channel is selected for viewing and the current programming on that channel is displayed on the presentation device 120. The user may move the cursor by activating corresponding directional buttons, page up or page down buttons, trackball, joystick or other navigational controls on the remote control device 128 or other mobile device, or on the receiving device 118 itself. Using such controls, the user may navigate the EPG by scrolling or paging up or down or side to side within an EPG to move to different rows and/or or columns within the EPG to view various different channel listings and/or program listings within the EPG. While scrolling, the cursor may visit momentarily each channel through which the user scrolls. While paging, the cursor typically only visits the first channel on each page of the EPG shown on the presentation device 120, which provides for quicker navigation to channels far down or far up the table. However, the EPG may have hundreds or thousands of channel listing and, thus, it may take an inconvenient amount time for the user to scroll or page to the channel or various groups of channels that are of interest. Therefore, the channel monitoring module 215 may detect such channels that the cursor visits frequently or visits for relatively long periods of time. The pattern detection module 234 may determine that such channels are those that the user is likely to return to when browsing the EPG in the future, and the guide generation engine 217 then adapts the EPG to present such channels on top of the EPG together with each other separately from the other channels presented in the electronic program guide. This may be performed each time the EPG is opened. In doing so, this enables the user to start navigation within the EPG within a table of channels that the user is more likely to return to, thus improving the EPG system by saving the user time in not having to scroll or page to the channels of interest each time the EPG is opened. Returning to the channel within the EPG as used herein means moving an EPG selection cursor to that channel or otherwise selecting the channel for viewing or previewing. Also, when the electronic program guide is opened by the user, the guide generation engine 217 may initially place the EPG selection cursor on a first channel of the determined group of channels that the user is more likely to return to in the EPG based on the monitored patterns of browsing within the electronic program guide. In some embodiments, the first channel of the determined group of channels on which the cursor is initially placed is always the most recent channel viewed by the user.

The channel monitoring module 215 may monitor, store and/or communicate indications of various browsing activity continuously or over pre-defined periods of time selected by the user or other individuals. As used herein, channel browsing activity may include, but is not limited to, one or more of: moving a cursor to a location of a channel within an EPG, moving a cursor to a location of a program within a channel within an EPG, scrolling through or to one or more channels within an EPG, paging through or to one or more channels within an EPG, pressing a channel up button on a remote control device, pressing a channel down button on a remote control device, selecting a program on a channel within an EPG, previewing a channel within an EPG, selecting a channel within an EPG for viewing, selecting a channel within an EPG for previewing, directly entering a channel number to view a channel, selecting a program for viewing on a channel within an EPG, selecting display of further information about a channel or a program within an EPG, highlighting one or more channels or programs within an EPG, pre-selecting one or more channels or programs within an EPG, selecting for recording one or more channels or programs on channels within an EPG and causing particular channel listings of an EPG to be displayed on a display screen.

Such browsing activity may also be associated with a particular user or users and such activity or associations stored in a user profile or user account remotely at the remote monitoring system 122, content provider 104, program distributor 106, and/or information provider 138, and/or on the other data store 220. Using such stored information, upon user identification by the user detection module 232, a customized EPG having a particular group of channels that the identified user is likely to return to located separately on top of the EPG may be generated by the guide generation engine 217 and presented to that identified user on the presentation device 120 when that user opens the EPG. In some embodiments, the user detection module 232 may identify the user by various credentials and/or biometric data input to or otherwise received by the receiving device 118, presentation device and/or remote control device 128. For example, an identity of a particular user may be based on facial recognition of the particular user via a camera coupled to the receiving device 118, presentation device and/or remote control device 128 and associated facial recognition system and/or software modules embedded in or in operable communication with the user detection module 232 of the receiving device 118, remote monitoring system 122, content provider 104, program distributor 106, and/or information provider 138.

In some embodiments, the pattern detection module 234 may determine lengths of time channels are displayed in the electronic program guide on the display screen while a user is browsing within the electronic program guide. In particular, even if the cursor does not navigate to, visit, land on or is not otherwise left on a channel, the user may be visually browsing the channels currently displayed on the display screen of the presentation device 120 as indicated by the length of time the user leaves the current channels on the display screen without moving them off the screen by scrolling or paging to other channels. The pattern detection module 234 may determine that longer lengths of time for which the channels are displayed by the electronic program guide on the display screen indicate a higher likelihood that the user will want to return to those channels while browsing within the EPG in the future. The pattern detection module 234 may also determine lengths of time the user leaves the selection cursor on channels within the electronic program guide. For example, for each channel in the EPG, this may be a total length of time the cursor has been on that channel over a defined time period of monitoring channel browsing by the channel monitoring module 215. The pattern detection module 234 may determine that a longer total length of time the cursor has been on that channel indicates a higher likelihood that the user will want to return to that channel while browsing within the EPG in the future.

In some embodiments, the pattern detection module 234 may determine one or more channels which the user selects for viewing. The pattern detection module 234 may determine that a channel being selected for viewing indicates a higher likelihood that the user will want to return to that channel while browsing within the EPG in the future. In some embodiments, selecting a channel for viewing may indicate a higher likelihood that the user will want to return to that channel while browsing within the EPG in the future than if the user placed the cursor on that channel while browsing in the EPG, but did not ever select the channel for viewing, or did not select the channel for viewing within a pre-defined time period. The pattern detection module 234 may also determine one or more channels which the user selects for viewing by directly entering channel numbers. The pattern detection module 234 may determine that a channel being selected for viewing by directly entering channel numbers indicates a higher likelihood that the user will want to return to that channel while browsing within the EPG in the future. In some embodiments, the pattern detection module 234 may determine that directly entering channel numbers indicates a higher likelihood that the user will want to return to that channel while browsing within the EPG in the future than if the user selected the channel for viewing by navigating to the channel in the EPG.

In some embodiments, the EPG generated by the guide generation engine 217 may have a preview option selectable by the user within the EPG to preview the channel in a reduced-size screen within the EPG or preview information regarding a channel or programming within the EPG. Thus, the pattern detection module 234 may determine the frequency that each channel in the electronic program guide is previewed. The pattern detection module 234 may determine that there is a higher likelihood that the user will want to return to channels while browsing within the EPG in the future which have been previewed more frequently than other channels. In one embodiment, the pattern detection module 234 determines channels on which the user previews one or more programs within the electronic program guide and also determines the lengths of time the user previews the programs within the electronic program guide on the one or more channels. Such determined lengths of time the user previews the programs within the electronic program guide and the associated channels may be stored by the pattern detection module in the other data store 220. The pattern detection module 234 may then rank channels to which the user moved the selection cursor while browsing within the electronic program guide and on which the user previewed one or more programs higher than other channels to which the user moved the selection cursor, but on which the user did not preview any programs.

The pattern detection module 234 may give various weights or priorities to the above criteria and other criteria described herein in order to rank or otherwise sort channels to determine a group of channels presented in the electronic program guide that a user is more likely to return to than other channels presented in the electronic program guide based on the monitored patterns of browsing within the electronic program guide. Such selection criteria, weights and/or priorities may be selectable by the user or other individual, entity or system, such as, for example, the remote monitoring system 122, content provider 104, program distributor 106, and/or information provider 138. For example, in some embodiments, the pattern detection module 234 compares to each other the determined lengths of time that the user left the selection cursor on channels within the electronic program guide. The pattern detection module 234 ranks channels within the electronic program guide based on the comparison of the determined lengths of time that the user left the selection cursor on the channels. In some embodiments, the pattern detection module 234 determines lengths of time the user views the channels presented in the electronic program guide which the user selects for viewing over the defined period of time. The pattern detection module 234 then stores the determined lengths of time the user views the channels in the other data store 220. In some embodiments, the pattern detection module 234 may rank channels within the electronic program guide which the user selected for viewing over the defined period of time higher than other channels within the electronic program guide which the user did not select for viewing over the defined period of time. In some embodiments the pattern detection module 234 compares to each other the determined lengths of time the user views the channels. The pattern detection module 234 may then rank channels within the electronic program guide to which the user moved the selection cursor while browsing within the electronic program further based on the comparison to each other of the determined lengths of time the user viewed the channels.

The pattern detection module 234 then determines a group of top ranked channels according to the ranking of channels to be the group of channels presented in the electronic program guide that a user is more likely to return to than other channels presented in the electronic program guide. The size of this top ranked group of channels to be presented separately as a group within the EPG may vary and may be selectable by the user or other individual, entity or system, such as, for example, the remote monitoring system 122, content provider 104, program distributor 106, and/or information provider 138. For example, the size may be, or depend on, the total number of channels that are able to be displayed at one time on the display screen of the presentation device 120. In some embodiments, the size may be, or depend on, a percentage of the size of or space available on the display screen of the presentation device 120. In other embodiments, the size may be limited, for example, only by certain thresholds or minimum selection criteria, such as a minimum amount of total time a cursor has been placed on the channel; a minimum amount of total time the channel has been displayed in the EPG on the display screen of the presentation device 120; a maximum amount of time since the channel has been displayed in the EPG on the display screen of the presentation device 120; a minimum number of times the channel has been selected for viewing or previewing and/or or a minimum amount of viewing time for the channel over a defined period. The above criteria may also be used as a basis for consideration of the ranking and for comparison with other channels and/or as a basis for initial inclusion in the group of channels to be presented separately as a group within the EPG.

In some embodiments, the pattern detection module 234 may increase the likelihood that the separate group of channels presented on top of the adaptive electronic program guide include those that a user is more likely to return to by taking into account the time of day, a day of week and a time of year the particular browsing activity occurred. This is because the pattern detection module 234 may determine, or have an operational rule stored in the operation rules store 216 which indicates, there is some appreciable likelihood that the user will visit the same channels during the same time of day each day, during the same day of week each week and/or during the same time of year each year. Thus, the pattern detection module 234 may select to use browsing activity that has occurred in the same time of day, a day of week and/or time of year as that when it is selecting which channels to include in the group. For example, the pattern detection module 234 may associate one or more of a time of day, a day of week and a time of year with each occurrence of the user leaving the selection cursor on channels within the electronic program guide and store the association in the other data store 220. When performing the selection, the pattern detection module 234 then determines the current time of day, the current day of week and/or the current time of year and limits the comparison of the determined lengths of time that the user left the selection cursor on channels within the electronic program guide to be determined lengths of time associated with the current time of day, the current day of week and/or the current time of year. The pattern detection module 234 may then rank each channel to which the user moved the selection cursor while browsing within the electronic program guide based on the comparison limited to the determined lengths of time associated with the current time of day, the current day of week and/or the current time of year.

The pattern detection module 234 may utilize various decision making, priority sorting, and/or other multi-criteria decision analysis processes using the above criteria and other criteria described herein to rank or sort the channels and to determine a top ranked group of channels to be the group of channels presented separately in the electronic program guide that a user is more likely to return to. In one embodiment, the pattern detection module 234 receives a list of channels presented in the electronic program guide and sorts the list according to various multiple-criteria sorting rules stored in the operation rules store 216. As one non-limiting example, the pattern detection module 234 may sort the list by ranking channels in the list according to frequency of being selected for viewing, including a frequency of zero for channels that have not been selected for viewing. Then, for channels in the list having a same frequency of being selected for viewing (which would include those channels having a frequency of viewing of zero), sorting the list according to frequency of the channels in the list being previewed, including a frequency of zero for channels that have not been previewed. Then, for channels in the list having a same frequency of being selected for viewing and a same frequency of being previewed (which would include those channels having a frequency of viewing and a frequency of previewing of zero), the pattern detection module 234 may sort the list by ranking channels having a larger total time on which the user left the selection cursor while browsing the electronic program guide higher than other channels having a lower total time on which the user left the selection cursor. For channels in the list having a same total time on which the user left the selection cursor on the channel (which would include those channels having a total time of zero because the EPG cursor never landed those channels), the pattern detection module 234 may sort the list by ranking channels having a larger total time displayed in the electronic program guide on the display screen while the user was browsing within the electronic program guide higher than other channels having a lower total time of being displayed in the electronic program guide on the display screen. Lastly, the pattern detection module 234 may sort the list by at least ranking any channels the user selected for viewing by directly entering channel numbers higher than other channels the user did not select for viewing by directly entering channel numbers.

The guide generation engine 217 then generates an adapted EPG in which is presented for selection, based on the monitored patterns of browsing within the electronic program guide, the determined group of channels that the user is more likely to return to together with each other separately from the other channels presented in the electronic program guide.

In some embodiments, the pattern detection module 234 selects to use the most recent monitored activity that has occurred to determine a list of channels that the user is more likely to return to within the EPG. For example, the determination of the group of channels by the pattern detection module 234 may be based on a portion of the monitoring patterns of browsing within the electronic program guide of channels presented in the electronic program guide that had occurred over a limited recent time window measured from a current time. This limited recent time window measured from a current time may be, for example, a past week, a past two weeks, a past month, a past six weeks, a past three months, a past year or some other amount of time and may also be selectable by the user or other authorized individual or entity.

Other code or programs 230 (e.g., an audio/video processing module, a Web server, and the like), and potentially other data repositories, such as other data store 220, also reside in the memory 201, and preferably execute on one or more CPUs 203. Of note, one or more of the components in FIG. 2 may not be present in any specific implementation. For example, some embodiments may not provide other computer readable media 205 or a display 202.

In some embodiments, the channel monitoring and guide generation system 100 includes an application program interface ("API") that provides programmatic access to one or more functions of the channel monitoring and guide generation system 100. Such an API may provide a programmatic interface to one or more functions of the channel monitoring and guide generation system 100 that may be invoked by one of the other programs 230 or some other module. In this manner, the API enables software, such as user interfaces, plug-ins and adapters to integrate functions of the channel monitoring and guide generation system 100 into desktop computer or mobile device applications, and the like.

In addition, the API may be, in at least some embodiments, invoked or otherwise accessed via the channel monitoring and guide generation system 100, or remote entities, such as the program distributor 106 and the remote monitoring system 122, to access various functions of the channel monitoring and guide generation system 100. For example, the program distributor 106 and the remote monitoring system 122 may select particular criteria, selection processes, monitoring time windows, and EPGs, etc., to be used by the channel monitoring module 215 and pattern detection module 234, and/or guide generation engine 217; select particular video or audio signals to be output at the various I/O devices 204; perform particular configurations of the receiving device 118; or perform various recording and playback operations by the receiving device 118 via the API.

In an example embodiment, components/modules of the channel monitoring and guide generation system 100 are implemented using standard programming techniques. For example, the operation rules stored in the operation rules store 216 and electronic program guide generation engine 217 portions of the channel monitoring and guide generation system 100 may be implemented as a "native" executable running on the CPU 203, along with one or more static or dynamic libraries. In other embodiments, the operation rules stored in the operation rules store 216 and electronic program guide generation engine 217 portions of the channel monitoring and guide generation system 100 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the receiving device 118 to perform the functions of the channel monitoring and guide generation system 100 described herein. In one embodiment, instructions cause the CPU 203 or some other processor, such as an I/O controller/processor, to select and present various programming and to select and present the EPG based on the monitoring of channel browsing and pattern detection by the channel monitoring module 215 and pattern detection module 234. Similarly, the CPU 203 or other processor may be configured to perform other operations such as playing a recording in various playback modes.

The embodiments described above may also use well-known or other synchronous or asynchronous client-server computing techniques. However, the various components may be implemented using more monolithic programming techniques as well; for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously, and communicate using message passing techniques. Equivalent synchronous embodiments are also supported by a receiving device channel monitoring and guide generation system 100 implementation. Also, other functions could be implemented and/or performed by each component/module, and in different orders, and by different components/modules, yet still achieve the functions of the channel monitoring and guide generation system 100.

In addition, programming interfaces to the data stored as part of the channel monitoring and guide generation system 100, can be available by standard mechanisms such as through C, C++, C#, and Java APIs; libraries for accessing files, databases, or other data repositories; scripting languages such as XML; or Web servers, FTP servers, or other types of servers providing access to stored data. The operations rules 216 and other data store 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the channel monitoring and guide generation system 100.

Furthermore, in some embodiments, some or all of the components of the channel monitoring and guide generation system 100 may be implemented or provided in other manners, such as at least partially in firmware and/or hardware, including, but not limited to one or more application-specific integrated circuits ("ASICs"), standard integrated circuits, controllers (e.g., by executing appropriate instructions and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a non-transitory computer-readable storage medium to be read by an appropriate drive or via an appropriate connection, such as a DVD, random access memory (RAM) or flash memory device) so as to enable or configure the computer-readable medium and/or one or more associated computing systems or devices to execute or otherwise use or provide the contents to perform at least some of the described techniques. A transitory computer-readable medium as used herein means a signal transmission itself (for example, a propagating electrical or electromagnetic signal itself) and not the hardware medium on which information is stored. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 3:
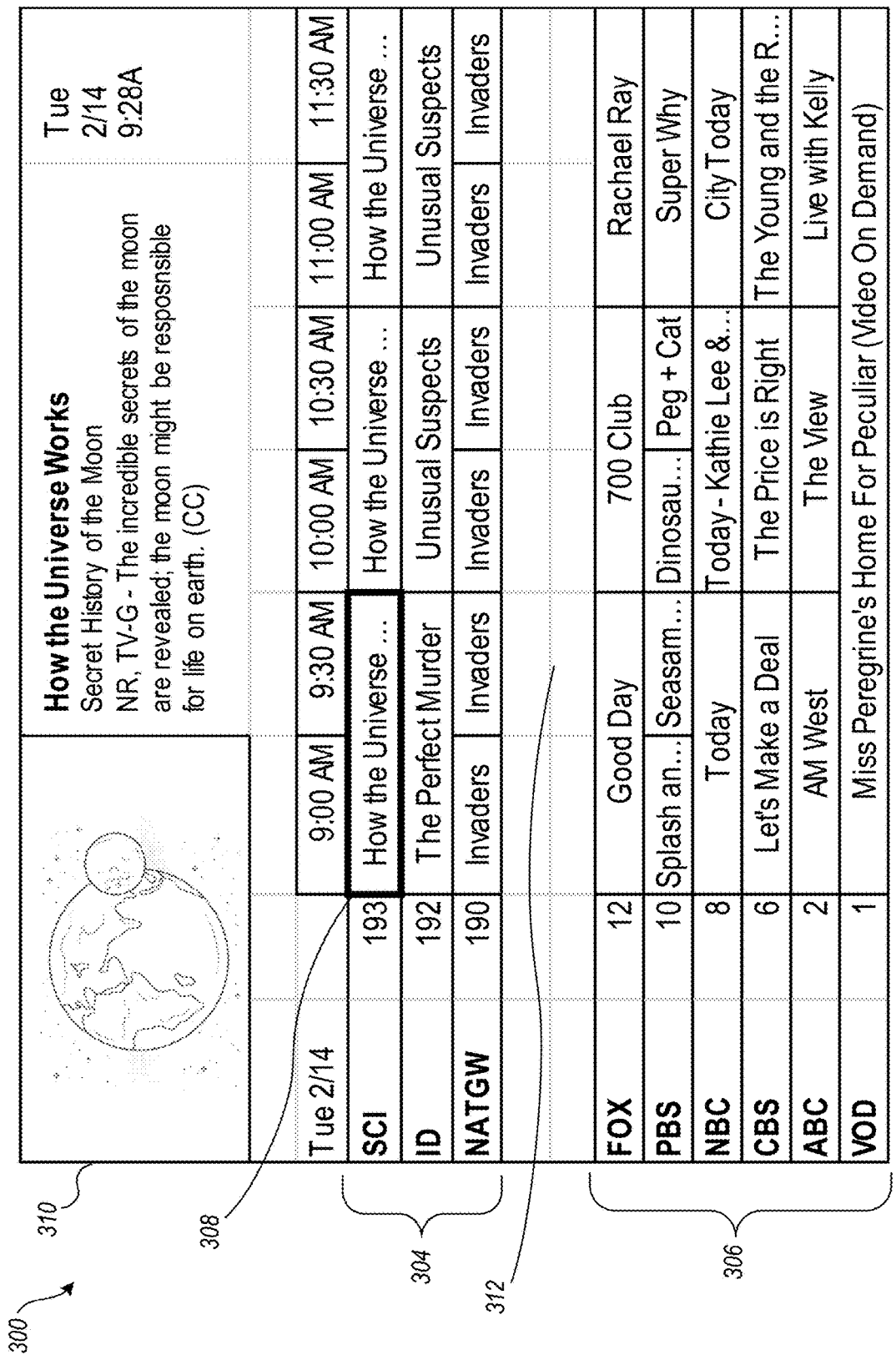
FIG. 3 is an example adaptive electronic program guide with an adaptive frequented channel section and a static section according to one non-limiting embodiment.

FIG. 3 is an example adaptive electronic program guide 300 with an adaptive frequented channel section 304 and a static section 306 according to one non-limiting embodiment. As explained above, the guide generation engine 217 generates an adaptive EPG 300 in which is presented for selection, based on the monitored patterns of browsing within the electronic program guide, the determined group of channels that the user is more likely to return to together with each other separately from the other channels presented in the electronic program guide. An example of such an adaptive EPG 300 is shown in FIG. 3, with the determined group of channels that the user is more likely to return to displayed in section 304 of the EPG 300 and referred to herein as the frequented channel section 304. The other channels of the adaptive EPG 300 are shown in section 306 in their normal order and are referred to herein as the static section 306. In the example shown in FIG. 3, in response to a command to open the adaptive EPG 300, the system has determined through monitoring of the most recent previous browsing activity within the adaptive EPG 300 that the user is most likely to return to channels 193, 192 and 190. Thus, in response to a command to open the adaptive EPG 300, the system has generated and presented the adaptive EPG 300 with channels 193, 192 and 190 included in the frequented channel section 304 at the top of the adaptive EPG 300. This is such that the user can immediately use the selection cursor 308 to start browsing through these channels to which they are more likely to want to return, and also select such channels for viewing, without having to scroll or page down to find them.

When the user reaches the end of the frequented channel section 304 with the selection cursor 308 and continues to move down the selection cursor 308, the system will place the selection cursor 308 on a first channel of the static section 306 (channel 12). In instances where the user is paging down through the frequented channel section 304 and passes the end of the frequented channel section 304, the cursor may be moved to the first channel in the static section 306 or, in some embodiments, to the channel in the static section 306 as measured from the last location of the cursor in the frequented channel section 304 according to the page down command. Similarly, as the user reaches the top of the static section 306 with the selection cursor 308 and continues to move up the selection cursor 308, the system will place the selection cursor 308 on the last channel of the static section 306 (channel 190). In some embodiments, the system may present an alert or warning or other prompt to the user either letting the user know the user is leaving or entering the frequented channel section 304 and/or prompting for a confirmation from the user in order to leave or re-enter the frequented channel section 304. In some embodiments, there may be a separate button on the remote control device 128 or other command, menu item or button selectable within the adaptive EPG 300 to bring the cursor 308 directly back to the frequented channel section 304 or directly to the first channel within the frequented channel section 304.

The size and/or number of channels included in of the frequented channel section 304 may vary according to how many channels fit the selection criteria described herein, selectable user preferences, display screen size and/or other criteria. In FIG. 3, there is a space 312 separating the frequented channel section 304 and the static section 306. However, in other embodiments, there may be other items delineating the frequented channel section 304 and the static section 306, such as a label, bolding, different font, highlighting, etc.

In some embodiments the frequented channel section 304 may be located in other areas of the adaptive EPG 300, such as below the static section 306, or along a left or right side of the EPG beside the static section 306 instead of above the static section 306. In some embodiments, the frequented channel section 304 may be or occupy a frozen pane on the EPG 300 that is always visible on the display screen of the presentation device 120 regardless of the scrolling that may occur within the frequented channel section 304 or the static section 306, and may be scrollable separately from the static section 306. In such embodiments, there may be a separate button on the remote control device 128 or other command, menu item or button selectable within the adaptive EPG 300 to move the cursor 308 between the frequented channel section 304 and the static section 306 of the adaptive EPG 300. In some embodiments, a preview section 310 may display programming of, and/or information regarding, the channel on which the cursor 308 is currently placed. In other embodiments, the user must select the channel for viewing, or select a separate preview or information command or button to preview the desired channel in the preview section 310.

Figure 4:
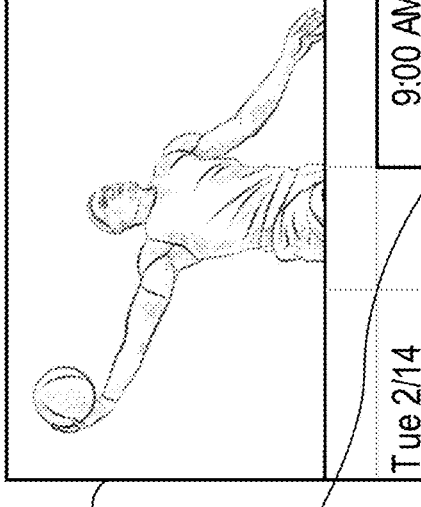
FIG. 4 is the example adaptive electronic program guide of FIG. 3 with another adaptive frequented channel section and a static section according to one non-limiting embodiment.

FIG. 4 is the example adaptive electronic program guide of FIG. 3 with another adaptive frequented channel section 404 and a static section 306 according to one non-limiting embodiment. In FIG. 4, shown is an updated determined group of channels that the user is more likely to return to, displayed in the adaptive EPG 300 as the updated frequented channel section 404. The other channels of the adaptive EPG 300 are shown in the static section 306 in their normal order. In the example shown in FIG. 4, in response to a command to open the adaptive EPG 300, the system has determined through monitoring of the most recent previous browsing activity within the adaptive EPG 300 that the user is most likely to return to channels 156, 155 and 154. This group is different than the frequented channel section 304 because it has been updated due to either a different user being identified as using the adaptive EPG 300 who has different channel browsing history, or because the most recent monitored channel browsing activity has changed, thus changing the channels that the system determined the user would likely return to. Note that although the channels included in updated frequented channel section 404 are consecutive, as they often will be due to the normal order of channels often being grouped according to common categories of interest (e.g., sports or movies), they need not be consecutive, and are individually selected according to various criteria related to channel browsing history as described herein. For example, in some embodiments, the frequented channel section 404 may include channels 156, 155 and 154 along with other channels or groups of channels, such as channels 193, 192 and 190 shown in the frequented channel section 304 in FIG. 3.

Figure 5:
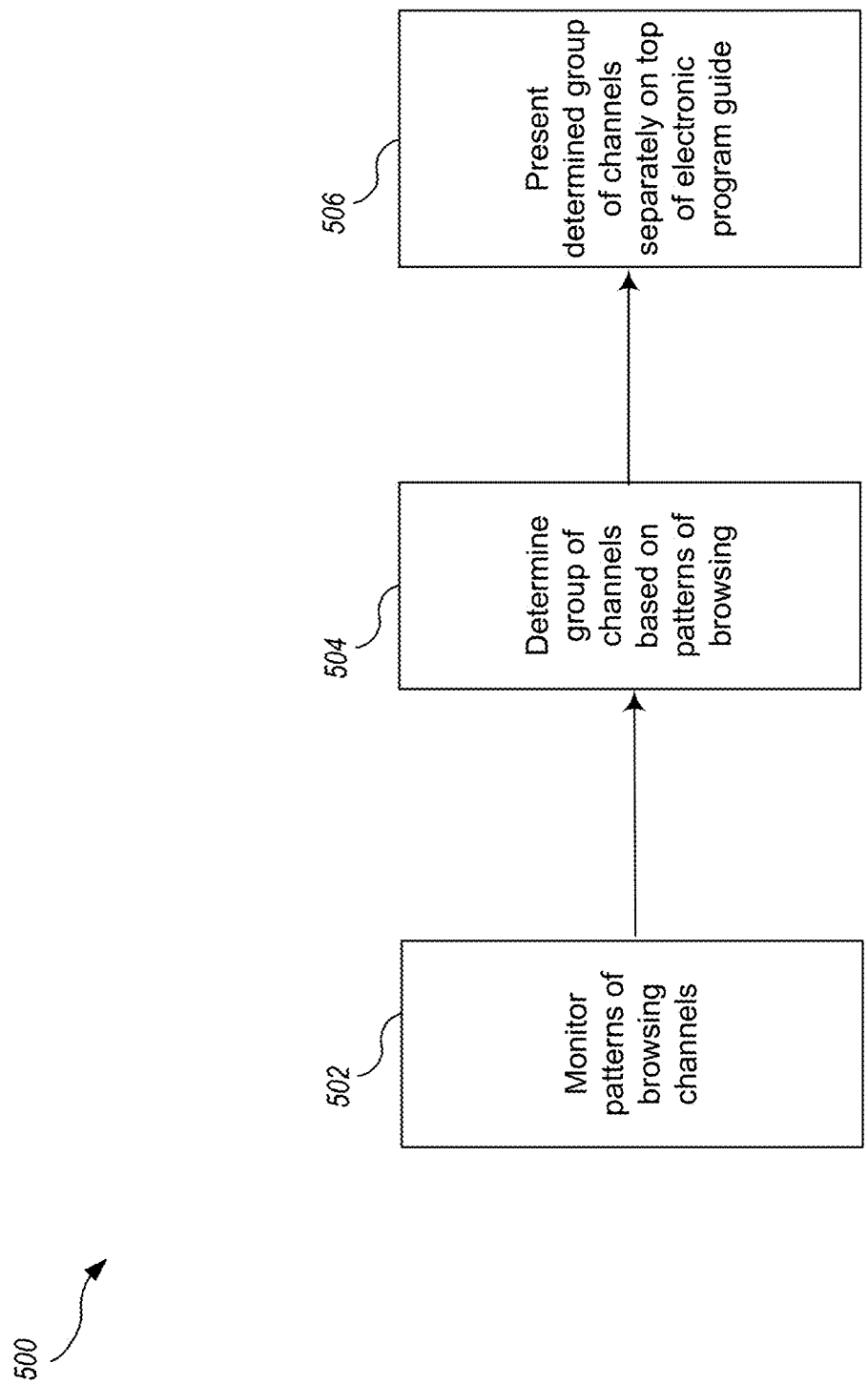
FIG. 5 is a flow diagram of an example method for an adaptive electronic program guide according to one non-limiting embodiment.

FIG. 5 is a flow diagram of an example method 500 for an adaptive electronic program guide according to one non-limiting embodiment.

At 502, the channel monitoring and guide generation system 100 monitors patterns of browsing channels.

At 504, the channel monitoring and guide generation system 100 determines a group of channels based on the patterns of browsing channels.

At 506, the channel monitoring and guide generation system 100 presents the determined group of channels separately on top of an adaptive electronic program guide for navigation by the user.

Figure 6:
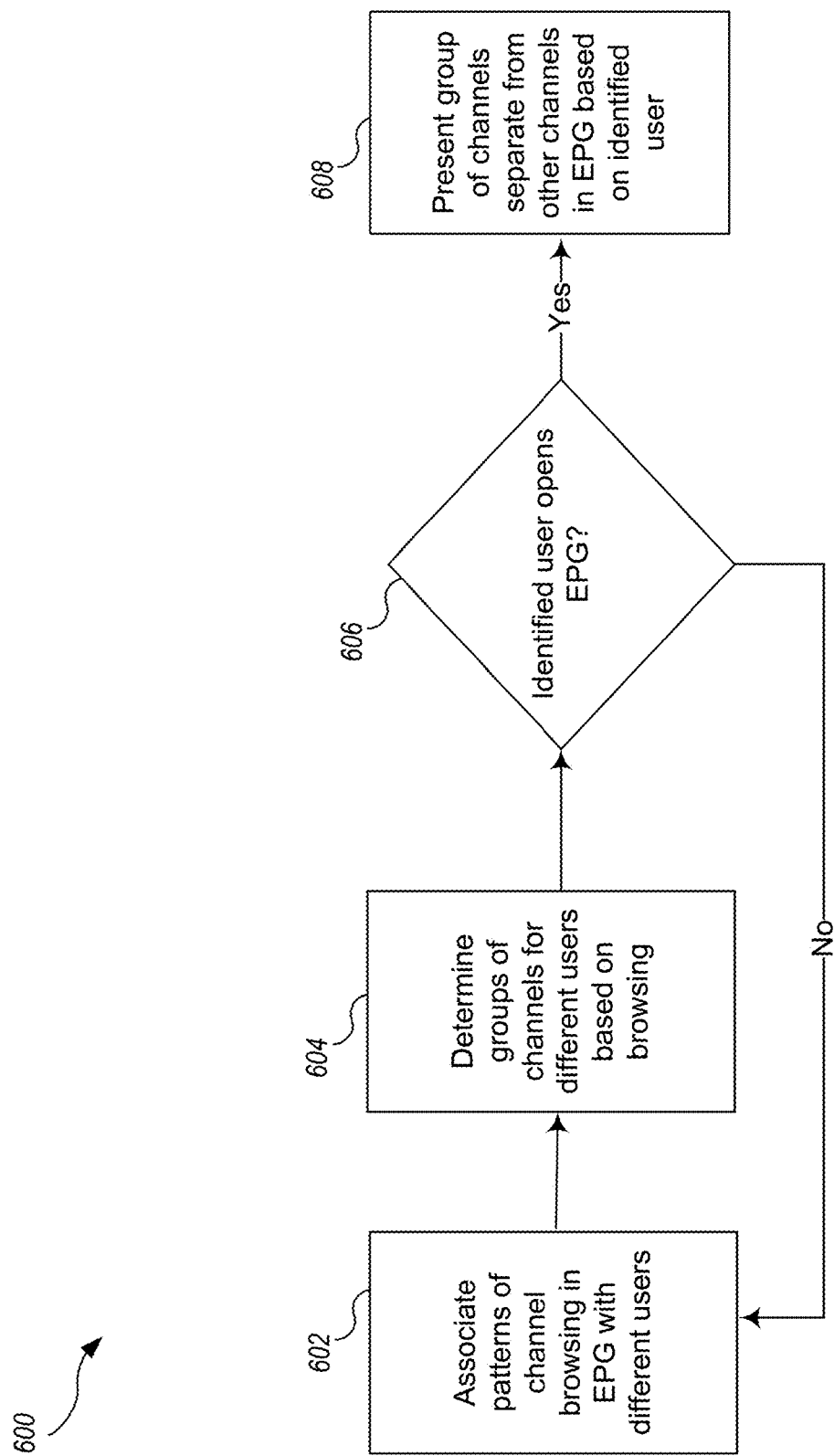
FIG. 6 is a flow diagram of an example method for an adaptive electronic program guide for multiple users according to one non-limiting embodiment.

FIG. 6 is a flow diagram of an example method 600 for an adaptive electronic program guide for multiple users according to one non-limiting embodiment.

At 602, the channel monitoring and guide generation system 100 associates patterns of channel browsing in the EPG with different users.

At 604, the channel monitoring and guide generation system 100 determines groups of channels for different users based on the associated patterns of channel browsing for each user.

At 606, the channel monitoring and guide generation system 100 determines whether an identified user has opened the EPG. If the channel monitoring and guide generation system 100 determines that an identified user has opened the EPG, then the process proceeds to 608. If the channel monitoring and guide generation system 100 determines that an identified user has not opened the EPG, then the process proceeds back to 602.

At 608, the channel monitoring and guide generation system 100 presents a group of channels for browsing by the user separate from other channels in the EPG based on the associated patterns of channel browsing for that identified user.

Figure 7:
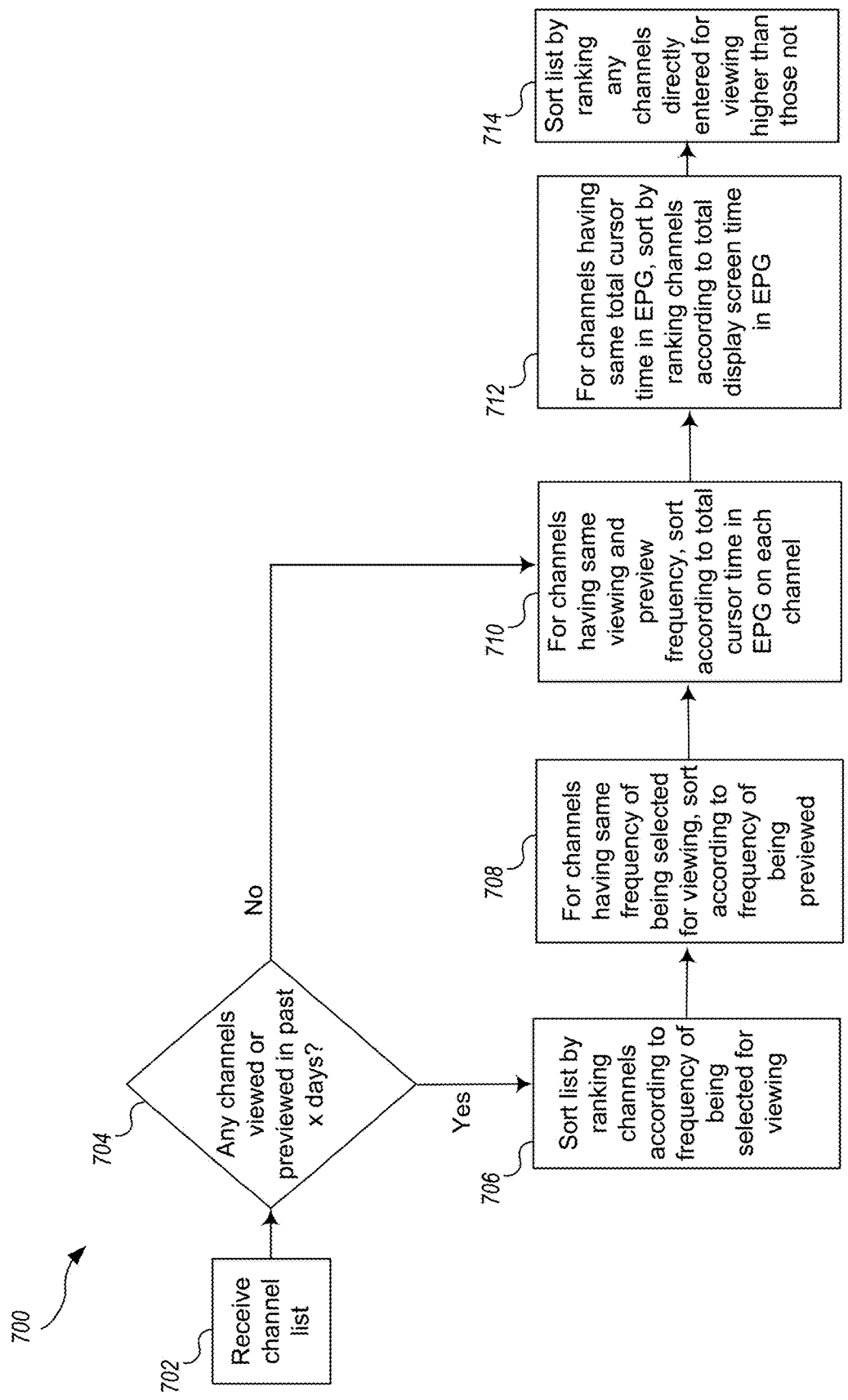
FIG. 7 is a flow diagram of an example algorithm for selecting frequented channels based on patterns of channel browsing useful in a method for an adaptive electronic program guide according to one non-limiting embodiment.

FIG. 7 is a flow diagram of an example algorithm 700 for selecting frequented channels based on patterns of channel browsing useful in a method for an adaptive electronic program guide according to one non-limiting embodiment.

At 702, the channel monitoring and guide generation system 100 receives a channel list.

At 704, the channel monitoring and guide generation system 100 determines whether any channels in the received list have been viewed or previewed in the past x days, where x is a variable selectable by a user or other entity. Example values for x include a past day, a past week, a past two weeks, a past month, a past six weeks, a past three months, and a past year, but x is not limited to these values. If the channel monitoring and guide generation system 100 determined that one or more channels in the received list have been viewed or previewed in past x days, then the process proceeds to 706. If the channel monitoring and guide generation system 100 determined that there were no channels in the received list that have been viewed or previewed in past x days, then the process proceeds to 710.

At 706, the channel monitoring and guide generation system 100 then sorts the list by ranking channels according to frequency of being selected for viewing.

At 708, for channels having the same frequency of being selected for viewing (including those having a viewing frequency of zero), the channel monitoring and guide generation system 100 then sorts the list according to frequency of being previewed.

At 710, for channels having the same viewing and preview frequency (including those having a previewing frequency of zero), the channel monitoring and guide generation system 100 then sorts the list according to total cursor time in the EPG on each channel.

At 712, for channels having the same total cursor time in the EPG (including those having a total cursor time of zero), the channel monitoring and guide generation system 100 then sorts the list sort by ranking channels according to total display screen time in the EPG (i.e., channels displayed in the EPG on the screen of the presentation device 120, but which did not necessarily have a cursor visit them).

At 714, the channel monitoring and guide generation system 100 then sorts the list by ranking any channels whose numbers were directly entered for viewing of the channels higher than those whose numbers were not directly entered for viewing of the channels.

While various embodiments have been described hereinabove, it is to be appreciated that various changes in form and detail may be made without departing from the scope of the invention(s) presently or hereafter claimed.

The invention claimed is:

1. A system for an adaptive electronic program guide, the system comprising:
at least one processor; and
at least one memory coupled to the at least one processor, wherein the at least one memory has computer-executable instructions stored thereon that, when executed by the at least one processor, cause the at least one processor to:
monitor patterns of browsing within an electronic program guide of channels presented in the electronic program guide, wherein the monitoring patterns of browsing within the electronic program guide of channels presented in the electronic program guide includes the computer-executable instructions, when executed by the at least one processor, causing the at least one processor to:
monitor movement of the cursor within the electronic program guide;
determine lengths of time the user leaves a selection cursor on channels within the electronic program guide to which the user moves the selection cursor prior to selection of the channels for viewing while browsing within the electronic program guide based on the monitoring of the cursor within the electronic program guide; and
store the determined lengths of time;
determine a group of channels presented in the electronic program guide that a user is more likely to return to than other channels presented in the electronic program guide based on the monitored patterns of browsing within the electronic program guide; and
present for selection in the electronic program guide, based on the monitored patterns of browsing within the electronic program guide, the determined group of channels that the user is more likely to return to together with each other separately from the other channels presented in the electronic program guide.

2. The system of claim 1 wherein the determining a group of channels presented in the electronic program guide that a user is more likely to return to includes the computer-executable instructions, when executed by the at least one processor, causing the at least one processor to:
compare to each other the determined lengths of time that the user left the selection cursor on channels within the electronic program guide to which the user moved the selection cursor while browsing within the electronic program guide;
rank channels within the electronic program guide to which the user moved the selection cursor while browsing within the electronic program guide based on the comparison to each other of the determined lengths of time that the user left the selection cursor on the channels;
determine a group of top ranked channels according to the ranking of channels within the electronic program guide to which the user moved the selection cursor; and determine the group of top ranked channels to be the group of channels presented in the electronic program guide that a user is more likely to return to than other channels presented in the electronic program guide.

3. The system of claim 2 wherein the monitoring patterns of browsing within the electronic program guide of channels presented in the electronic program guide includes the computer-executable instructions, when executed by the at least one processor, further causing the at least one processor to:
- associate one or more of a time of day, a day of week and a time of year with each occurrence of the user leaving the selection cursor on channels within the electronic program guide to which the user moves the selection cursor while browsing within the electronic program guide; and
- store the association of the one or more of a time of day, a day of week and a time of year with each occurrence of the user leaving the selection cursor channels within the electronic program guide to which the user moves the selection cursor while browsing within the electronic program guide.

4. The system of claim 3 wherein the comparing to each other the determined lengths of time that the user left the selection cursor on channels within the electronic program guide to which the user moved the selection cursor while browsing within the electronic program guide includes the computer-executable instructions, when executed by the at least one processor, causing the at least one processor to:
- determine one or more of a current time of day, a current day of week and a current time of year;
- limit the comparison to each other of the determined lengths of time that the user left the selection cursor on channels within the electronic program guide to be a comparison between determined lengths of time associated with the determined one or more of the current time of day, the current day of week and the current time of year, and wherein the ranking each channel within the electronic program guide to which the user moved the selection cursor while browsing within the electronic program guide is based on the comparison limited to the determined lengths of time associated with the determined one or more of the current time of day, the current day of week and the current time of year.

5. The system of claim 2 wherein the monitoring patterns of browsing within the electronic program guide of channels presented in the electronic program guide includes the computer-executable instructions, when executed by the at least one processor, further causing the at least one processor to:
- determine one or more channels on which the user previews one or more programs within the electronic program guide;
- determine lengths of time the user previews the one or more programs within the electronic program guide on the one or more channels; and
- store the determined lengths of time the user previews the one or more programs within the electronic program guide on the one or more channels.

6. The system of claim 5 wherein the ranking channels within the electronic program guide includes the computer-executable instructions, when executed by the at least one processor, further causing the at least one processor to:
- rank channels within the electronic program guide to which the user moved the selection cursor while browsing within the electronic program guide and on which the user previewed one or more programs within the electronic program guide higher than other channels to which the user moved the selection cursor while browsing within the electronic program guide but on which the user did not preview one or more programs within the electronic program guide.

7. The system of claim 6 wherein the computer-executable instructions, when executed by the at least one processor, further cause the at least one processor to:
- compare to each other the determined lengths of time the user previews the one or more programs within the electronic program guide on the one or more channels, wherein the ranking channels within the electronic program guide includes the computer-executable instructions, when executed by the at least one processor, further causing the at least one processor to:
- rank channels within the electronic program guide to which the user moved the selection cursor while browsing within the electronic program guide further based on the comparison to each other the determined lengths of time the user previews the one or more programs within the electronic program guide on the one or more channels.

8. The system of claim 2 wherein the patterns of browsing monitored do not include selection of a channel for viewing and wherein the computer-executable instructions, when executed by the at least one processor, further cause the at least one processor to:
- over a defined period of time, determine one or more channels presented in the electronic program guide which the user selects for viewing;
- determine lengths of time the user views the one or more channels presented in the electronic program guide which the user selects for viewing over the defined period of time; and
- store the determined lengths of time the user views the one or more channels presented in the electronic program guide which the user selects for viewing.

9. The system of claim 8 wherein the ranking channels within the electronic program guide includes the computer-executable instructions, when executed by the at least one processor, further causing the at least one processor to:
- rank channels within the electronic program guide which the user selected for viewing over the defined period of time higher than other channels within the electronic program guide which the user did not select for viewing over the defined period of time.

10. The system of claim 9 wherein the computer-executable instructions, when executed by the at least one processor, further cause the at least one processor to:
- compare to each other the determined lengths of time the user views the one or more channels presented in the electronic program guide which the user selects for viewing, wherein the ranking channels within the electronic program guide to which the user moved the selection cursor while browsing within the electronic program guide includes the computer-executable instructions, when executed by the at least one processor, further causing the at least one processor to:
- rank channels within the electronic program guide to which the user moved the selection cursor while browsing within the electronic program guide further based on the comparison to each other the determined lengths of time the user views the one or more channels presented in the electronic program guide which the user selects for viewing.

11. The system of claim 1 wherein the determination of the group of channels is based on a portion of the monitoring patterns of browsing within the electronic program guide of channels presented in the electronic program guide that .occurred over a limited recent time window measured from a current time.

12. The system of claim 11 wherein the limited recent time window measured from a current time is selected from the group consisting of: a past week, a past two weeks, a past month, a past six weeks, a past three months, and a past year.

13. The system of claim 11 wherein the limited recent time window measured from a current time is selectable by the user.

14. The system of claim 11 wherein the computer-executable instructions, when executed by the at least one processor, cause the at least one processor to perform the determination of the group of channels presented in the electronic program guide that the user is more likely to return to than other channels presented in the electronic program guide each time the electronic program guide is presented.

15. The system of claim 1 wherein the presenting in the electronic program guide, based on the monitored patterns of browsing within the electronic program guide, the determined group of channels that the user is more likely to return to includes the computer-executable instructions, when executed by the at least one processor, causing the at least one processor to:
present the determined group of channels that the user is more likely to return to in a top portion of the electronic program guide above and separate from the other channels presented in the electronic program guide.

16. The system of claim 15 wherein the presenting in the electronic program guide, the determined group of channels that the user is more likely to return to includes the computer-executable instructions, when executed by the at least one processor, further causing the at least one processor to:
when the electronic program guide is opened by the user, initially place a selection cursor on a first channel of the determined group of channels that the user is more likely to return to based on the monitored patterns of browsing within the electronic program guide; and
place the selection cursor on a first channel of the other channels presented in the electronic program guide when, with the selection cursor, the user reaches an end of the determined group of channels that the user is more likely to return to and continues to move down the selection cursor.

17. The system of claim 16 wherein the electronic program guide comprises one or more tables of television channels wherein each row of the one or more tables represents a different television channel and includes programming of the different television channel, and each column of the one or more tables represents different time slots for the programming of the television channels and wherein the determined group of channels that the user is more likely to return to based on the monitored patterns of browsing within the electronic program guide is a separate table within the electronic program guide positioned and spaced above another table within the electronic program guide that includes the other channels presented in the electronic program guide.

18. A computerized method for an adaptive electronic program guide, the method comprising:
determining, by at least one computer processor, an identity of a particular user using an electronic program guide;
associating with the identified particular user, by at least one computer processor, patterns of browsing within the electronic program guide of channels presented in the electronic program guide based on the determined identity of the identified particular user, wherein the associating with the identified particular user patterns of browsing within the electronic program guide of channels presented in the electronic program guide includes monitoring patterns of browsing within the electronic program guide of channels presented in the electronic program guide, the monitoring patterns of browsing including:
monitoring movement of the cursor within the electronic program guide;
determining lengths of time the identified particular user leaves a selection cursor on channels within the electronic program guide to which the identified particular user moves the selection cursor prior to selection of the channels for viewing while browsing within the electronic program guide based on the monitoring of the cursor within the electronic program guide; and
storing the determined lengths of time;
determining, by at least one computer processor, a group of channels presented in the electronic program guide that the identified particular user is more likely to return to than other channels presented in the electronic program guide based on the monitored patterns of browsing within the electronic program guide associated with the identified particular user and based on an indication that the user has selected for recording one or more programs on the group of channels; and
in response to the determination of the identity of the particular user, presenting, by at least one computer processor, for selection in the electronic program guide, based on the monitored patterns of browsing within the electronic program guide associated with the identified particular user, the determined group of channels that the identified particular user is more likely to return to together with each other separately from the other channels presented in the electronic program guide.

19. The method of claim 18 wherein the determining, by at least one computer processor, an identity of a particular user is based on facial recognition of the particular user by at least one computer processor.

20. The method of claim 19 wherein the determining the group of channels presented in the electronic program guide that the identified particular user is more likely to return to than other channels presented in the electronic program guide is further based on whether the user selects for viewing one or more channels presented in the electronic program guide.

* * * * *